United States Patent
Oh et al.

(10) Patent No.: US 9,949,106 B2
(45) Date of Patent: Apr. 17, 2018

(54) METHOD AND APPARATUS FOR RE-SEARCHING RESOURCE OF DISCOVERY SIGNAL FOR DEVICE TO DEVICE COMMUNICATION IN WIRELESS COMMUNICATION SYSTEM

(71) Applicant: Samsung Electronics Co., Ltd., Gyeonggi-do (KR)

(72) Inventors: Jinyoung Oh, Seoul (KR); Yongjun Kwak, Gyeonggi-do (KR); Kyeongin Jeong, Gyeonggi-do (KR); Hyoungju Ji, Seoul (KR)

(73) Assignee: Samsung Electronics Co., Ltd. (KR)

( * ) Notice: Subject to any disclaimer, the term of this patent is extended or adjusted under 35 U.S.C. 154(b) by 61 days.

(21) Appl. No.: 14/907,487

(22) PCT Filed: Jul. 24, 2014

(86) PCT No.: PCT/KR2014/006763
§ 371 (c)(1),
(2) Date: Jan. 25, 2016

(87) PCT Pub. No.: WO2015/012621
PCT Pub. Date: Jan. 29, 2015

(65) Prior Publication Data
US 2016/0174057 A1    Jun. 16, 2016

(30) Foreign Application Priority Data
Jul. 26, 2013 (KR) .......... 10-2013-0088796

(51) Int. Cl.
*H04W 8/00* (2009.01)
*H04W 72/04* (2009.01)
*H04W 92/18* (2009.01)

(52) U.S. Cl.
CPC .......... *H04W 8/005* (2013.01); *H04W 72/04* (2013.01); *H04W 92/18* (2013.01)

(58) Field of Classification Search
CPC ...... H04W 8/005; H04W 72/04; H04W 92/18
See application file for complete search history.

(56) References Cited

U.S. PATENT DOCUMENTS

| 8,135,400 B2 | 3/2012 | Shao et al. |
| 2014/0126417 A1 | 5/2014 | Kang et al. |

(Continued)

FOREIGN PATENT DOCUMENTS

| KR | 1020140122178 | 10/2014 |
| WO | WO 2013012222 | 1/2013 |

(Continued)

OTHER PUBLICATIONS

PCT/ISA/237 Written Opinion issued on PCT/KR2014/006763 (pp. 6).
PCT/ISA/210 Search Report issued on PCT/KR2014/006763 (pp. 3).

*Primary Examiner* — Marisol Figueroa
(74) *Attorney, Agent, or Firm* — The Farrell Law Firm, P.C.

(57) ABSTRACT

Provided is a method of sending and receiving signals for a user equipment (UE) in a mobile communication system. The method may include: receiving discovery signal configuration information; scanning a discovery signal resource region determined based on the discovery signal configuration information; transmitting a discovery signal at a resource of the discovery signal resource region selected based on the scanning result; and rescanning the discovery signal resource region on the basis of at least one of the discovery signal configuration information and the scanning result. There are provided a method and apparatus for sending and receiving a discovery signal for D2D commu- (Continued)

nication in a wireless communication system. A UE is allocated discovery signal transmission resources via signaling from the ENB and periodically rescans the discovery signal transmission resources. Thereby, it is possible to send and receive discovery signals in a more efficient manner.

16 Claims, 14 Drawing Sheets

(56) References Cited

U.S. PATENT DOCUMENTS

| | | | |
|---|---|---|---|
| 2014/0286284 A1 | 9/2014 | Lim et al. | |
| 2014/0286293 A1 | 9/2014 | Jang et al. | |
| 2014/0295832 A1* | 10/2014 | Ryu | H04W 48/16 455/434 |
| 2014/0301228 A1 | 10/2014 | Kwak et al. | |

FOREIGN PATENT DOCUMENTS

| | | |
|---|---|---|
| WO | WO 2013062310 | 5/2013 |
| WO | WO 2013074463 | 5/2013 |
| WO | WO 2013077684 | 5/2013 |

* cited by examiner

METHOD AND APPARATUS FOR RE-SEARCHING RESOURCE OF DISCOVERY SIGNAL FOR DEVICE TO DEVICE COMMUNICATION IN WIRELESS COMMUNICATION SYSTEM

TECHNICAL FIELD

The present invention relates to a method and apparatus for rescanning discovery signal resources for device-to-device (D2D) communication in a wireless mobile communication system.

More particularly, the present invention relates to a method and apparatus that enable a user equipment (UE) to send and receive a discovery signal for discovering another UE in the proximity and to periodically rescan the discovery signal resource region and that enable a base station to allocate and manage resources for D2D discovery signal transmission and reception in accordance with UE operations in a communication system supporting both D2D communication and cellular communication.

BACKGROUND ART

Device-to-device (D2D) communication enables a user equipment (UE) to directly communicate with another UE in the vicinity thereof. Compared to existing communication technologies involving base stations (ENB), D2D communication facilitating easy frequency reuse between proximate UEs requires a smaller amount of radio resources and can be more efficient in the usage of radio resources. As D2D communication enables one UE to obtain information about nearby UEs, the obtained information can be used to create new services including advertisement services and social networking services (SNS). Currently, various efforts are underway to support D2D technologies, such as transmission and reception schemes for discovery signals to discover proximate UEs and schemes for synchronization in D2D communication, in the Long Term Evolution-Advanced (LTE-A) system.

FIG. 1 depicts a situation where D2D communication is supported in a cellular system.

In FIG. 1, the ENB 101 manages UEs 103, 104 and 105 remaining in the coverage of its cell 102. The UE 103 and the ENB 101 may perform cellular communication via a UE-ENB link 107; the UE 104 and the ENB 101 may perform cellular communication via a UE-ENB link 108; and the UE 105 and the ENB 101 may perform cellular communication via a UE-ENB link 109. Here, when D2D communication is possible between the UE 103 and the UE 104, the UE 103 and the UE 104 may directly exchange information via a D2D link 106 without passing through the ENB 101. However, if the radio resources used by the D2D link 106 for D2D communication between the UE 103 and the UE 104 are identical to those used by the link 109 for cellular communication between the UE 105 and the ENB 101, cellular communication and D2D communication cannot be correctly performed owing to interference therebetween. Hence, when D2D communication uses a cellular mobile communication system such as the LTE system, for correct operation of cellular communication and D2D communication, resources used by D2D communication may be separated from resources used by UEs using the existing cellular communication system.

As such, it is necessary to provide a method and apparatus that enable efficient usage of transmission resources for D2D communication.

DISCLOSURE OF INVENTION

Technical Problem

The present invention has been made in view of the above problems. Accordingly, an aspect of the present invention is to provide a method and apparatus that enable efficient utilization of discovery signal resources allocated by a base station to UEs for D2D communication by periodically rescanning the discovery signal resource region.

Solution to Problem

In accordance with an aspect of the present invention, there is provided a method of sending and receiving signals for a user equipment (UE) in a mobile communication system. The method may include: receiving discovery signal configuration information; scanning a discovery signal resource region determined based on the discovery signal configuration information; transmitting a discovery signal at a resource of the discovery signal resource region selected based on the scanning result; and rescanning the discovery signal resource region on the basis of at least one of the discovery signal configuration information and the scanning result.

In accordance with another aspect of the present invention, there is provided a user equipment (UE) sending and receiving signals in a mobile communication system. The user equipment may include: a transceiver unit to send and receive signals to and from at least one of another UE and a base station (ENB); and a control unit to perform a process of controlling the transceiver unit, scanning a discovery signal resource region determined based on configuration information, transmitting a discovery signal at a resource of the discovery signal resource region selected based on the scanning result, and rescanning the discovery signal resource region on the basis of at least one of the configuration information and the scanning result.

In accordance with another aspect of the present invention, there is provided a method of sending and receiving signals for a base station (ENB) in a mobile communication system. The method may include: sending discovery signal configuration information to a user equipment (UE); and receiving a discovery signal sent by the UE at a resource, wherein a discovery signal resource region is determined by the UE based on the discovery signal configuration information and the resource is selected by the UE from the discovery signal resource region according to the result of scanning the discovery signal resource region. Here, the UE rescans the discovery signal resource region on the basis of at least one of the discovery signal configuration information and the scanning result.

In accordance with another aspect of the present invention, there is provided a base station (ENB) sending and receiving signals in a mobile communication system. The ENB may include: a transceiver unit to send and receive signals to and from a user equipment (UE); and a control unit to perform a process of controlling the transceiver unit, sending discovery signal configuration information to the UE, and receiving a discovery signal sent by the UE at a resource, wherein a discovery signal resource region is determined by the UE based on the discovery signal configuration information and the resource is selected by the UE from the discovery signal resource region according to the result of scanning the discovery signal resource region. Here, the UE rescans the discovery signal resource region on the basis of at least one of the discovery signal configuration information and the scanning result.

Advantageous Effects of Invention

In a feature of the present invention, there are provided a method and apparatus for sending and receiving a discovery signal for D2D communication in a wireless communication system. A UE is allocated discovery signal transmission resources via signaling from the ENB, and the UE periodically rescans the discovery signal transmission resource region. Thereby, it is possible to send and receive D2D discovery signals in a more efficient manner.

MODE FOR THE INVENTION

Figure 1:
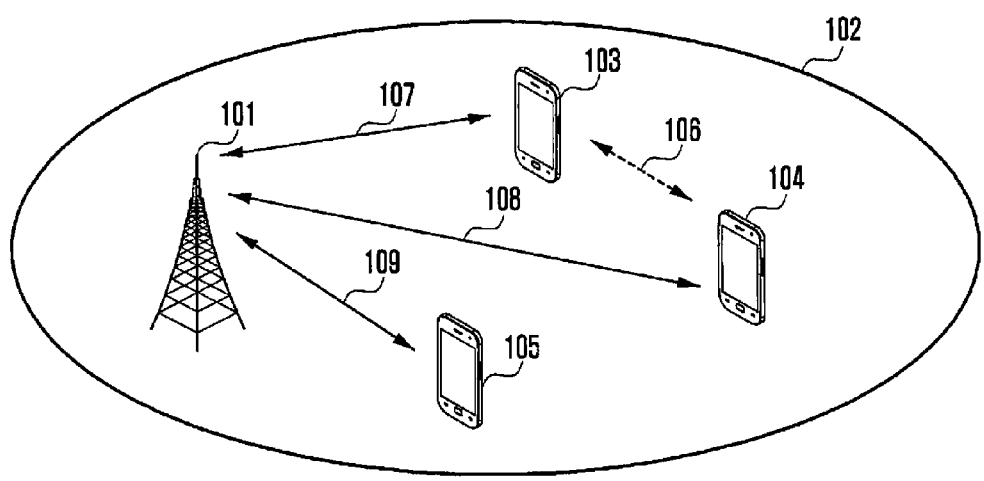
FIG. 1 depicts a situation where D2D communication is supported in a cellular system.

Hereinafter, embodiments of the present invention are described in detail with reference to the accompanying drawings.

Detailed descriptions of well-known functions and structures incorporated herein may be omitted to avoid obscuring the subject matter of the present invention.

In the drawings, some elements are exaggerated, omitted, or only outlined in brief, and thus may be not drawn to scale. The same or similar reference symbols are used throughout the drawings to refer to the same or like parts.

Figure 2:
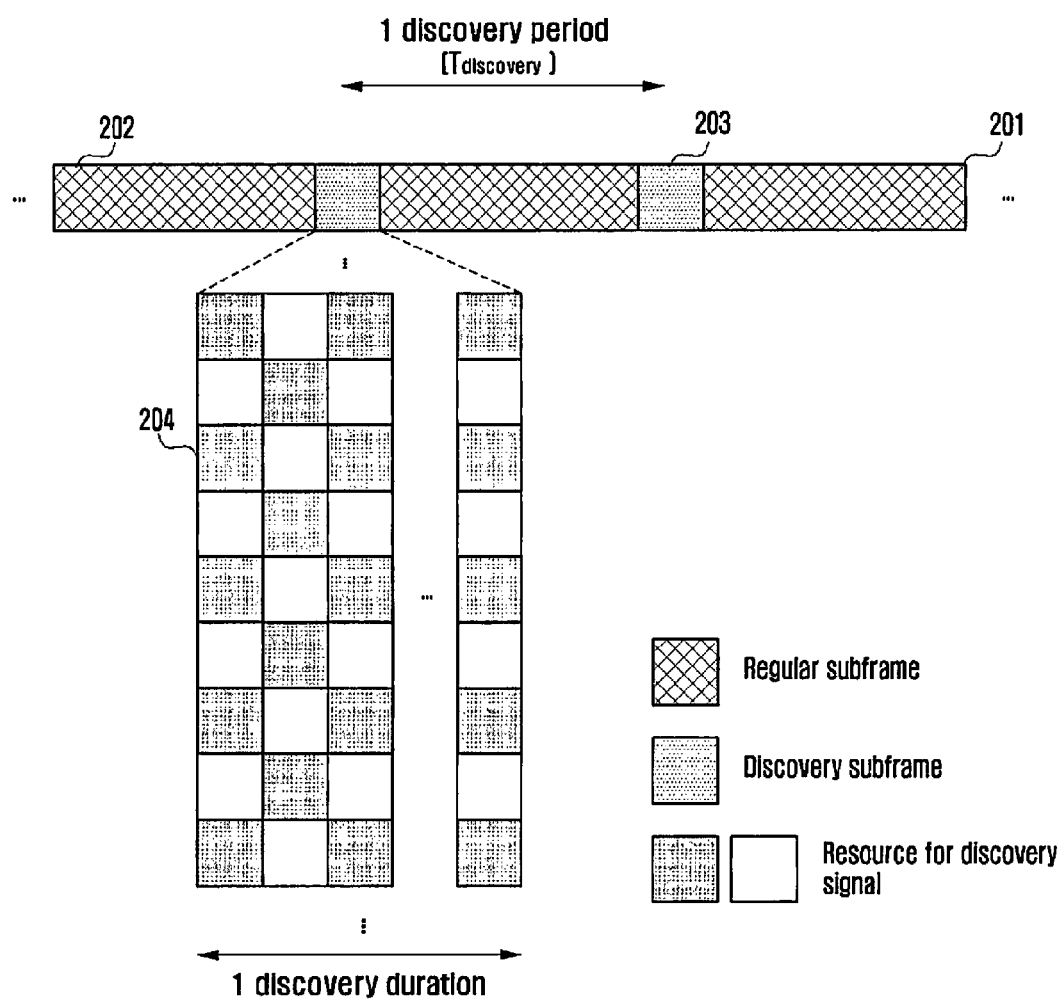
FIG. 2 illustrates patterns of radio resources when D2D communication uses a cellular mobile communication system.

FIG. 2 illustrates patterns of radio resources when D2D communication uses a cellular mobile communication system.

As shown in FIG. 2, among uplink resources of the LTE system composed of multiple subframe sets 201 in the time domain, some subframes may be used as resources for D2D communication. That is, cellular subframes indicated by indicia 202 may be allocated to UEs performing cellular communication, and D2D subframes as indicated by indicia 203 may be separately allocated to UEs performing D2D communication. Resources for D2D communication may include one or more subframes, and the amount of D2D communication resources may change in the frequency or time domain. D2D subframes may be allocated at regular intervals according to a preset period ($T_{discovery}$). D2D subframes may also be allocated aperiodically according to ENB settings.

D2D communication based on a cellular wireless mobile communication system such as the LTE system may be generally divided into D2D discovery of a UE and direct communication between UEs. Discovery operation of a UE may include transmitting a discovery signal containing information on the UE and receiving a discovery signal from another UE. UE discovery operation is illustrated in FIG. 3.

Figure 3:
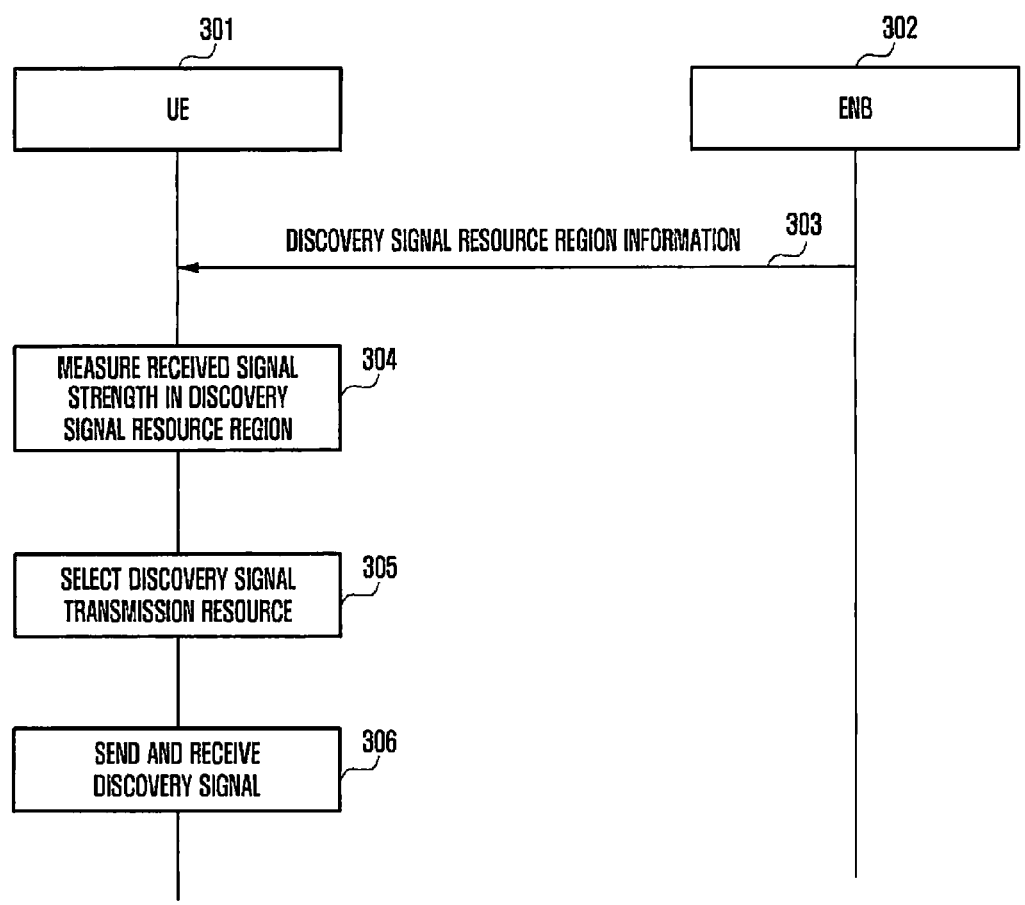
FIG. 3 depicts a procedure for D2D operation between the UE and ENB.

FIG. 3 depicts a procedure for D2D operation between the UE and ENB.

Referring to FIG. 3, at step 303, the UE 301 receives information on the region for radio resources to be used for D2D discovery signal transmission (D2D resources or discovery signal resources) from the ENB 302. Here, the discovery signal resource region information may be sent to all D2D UEs (including UE 301) in the cell via a system information block (SIB) broadcast by the ENB 302 or be sent specifically to the UE 301 via higher layer signaling or the like. When the UE 301 has information regarding the discovery signal resource region, step 303 may be skipped. The resource region allocated at step 303 may be changed by the ENB 302. In one embodiment, the ENB 302 may determine at least one of the amount and period of D2D communication resources on the basis of the strength of a discovery signal sent by the UE 301.

At step 304, the UE 301 measures the received signal strength at each resource of the discovery signal resource region as indicated by indicia 204 of FIG. 2. At step 305, the UE 301 compares the measured received signal strengths with each other to select the resource with the lowest received signal strength. At step 306, the UE 301 sends a discovery signal at the selected resource with the lowest received signal strength. At this time, the UE 301 may receive a discovery signal sent by a different UE 301 at the remaining resources of the discovery signal resource region except for the resource used by the UE 301 for discovery signal transmission. The offset for starting discovery signal transmission at step 306 may be determined according to settings of the UE 301 or information sent by the ENB 302 to the UE 301.

Figure 4:
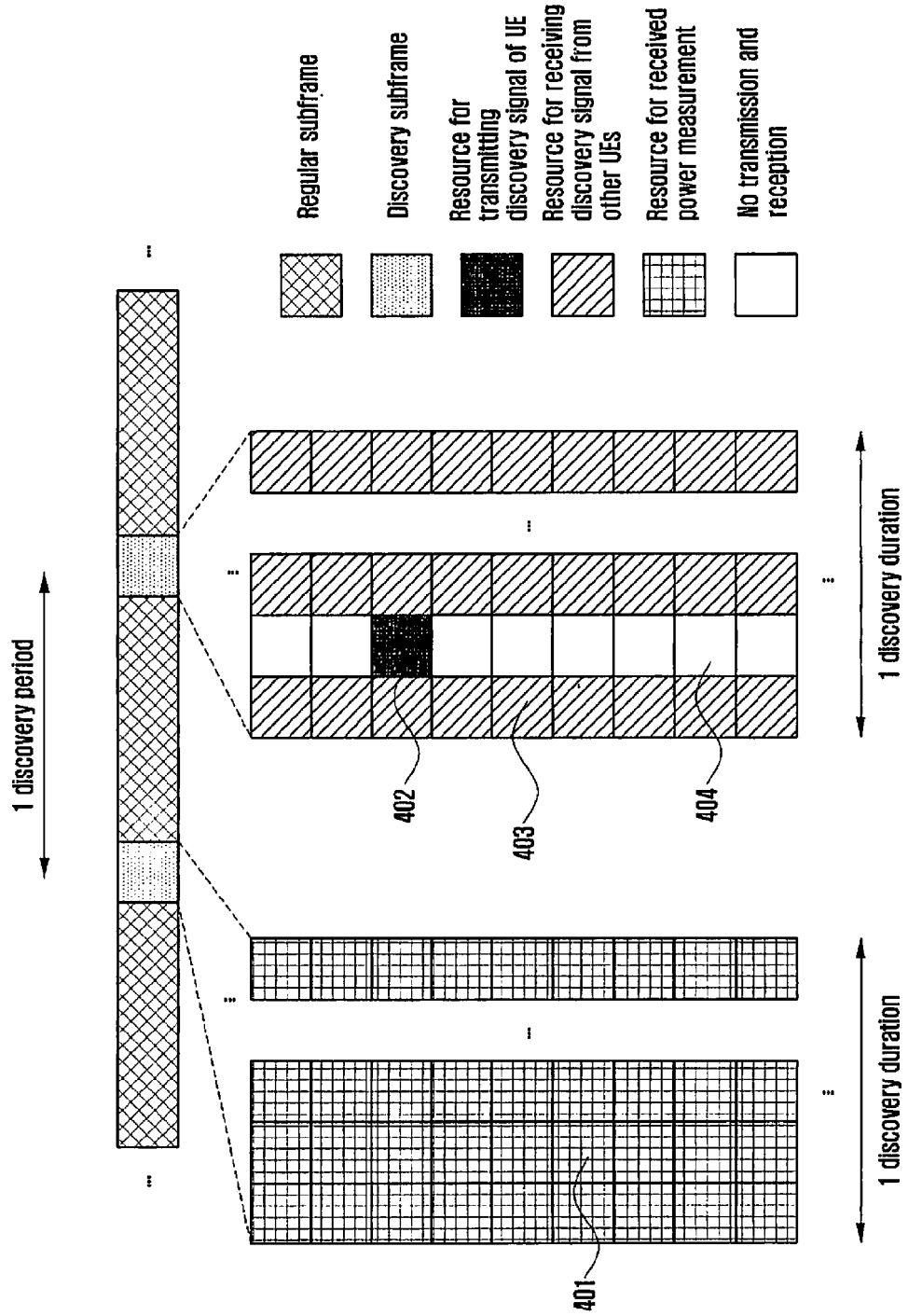
FIG. 4 depicts a procedure for a UE to send and receive a discovery signal.

FIG. 4 depicts a procedure for a UE to send and receive a discovery signal.

Referring to FIG. 4, to send and receive a discovery signal, a UE initiating D2D communication measures received signal strengths in the discovery signal resource region 401. Thereafter, the UE may send a discovery signal using a resource selected based on the measured received signal strengths. In one embodiment, the UE may select a resource 402 with the lowest received signal strength and send a discovery signal using the selected resource.

Later, after at least one discovery signal transmission period ($T_{discovery}$), the UE sends a discovery signal using the selected resource. Here, when the UE sends a discovery signal, it may be unable to receive a discovery signal from another UE at the same time. In this case, the UE may be unable to receive a discovery signal from another UE in a resource region 404 containing the resource 402 at which it sends a discovery signal. In addition, to receive a discovery signal before or after sending a discovery signal at the resource 402, it may take a little time for the UE to switch between transmission and reception.

For ease of description of the invention, it is assumed that the time for switching between transmission and reception is zero. However, the region where reception of a discovery signal is not possible owing to switching between transmission and reception may be included in the region 404 where reception of a discovery signal is not possible. That is, the UE may receive a discovery signal from another UE in the remaining resource region 403 except for the resource 402 and resource region 404.

In other words, a UE may be unable to receive a discovery signal from another UE while it is sending a discovery signal or switching between transmission and reception. Hence, during that time, the UE may be unable to measure states of the corresponding discovery resources such as channel quality and interference. For example, when the UE selects a resource with the lowest received signal strength in the discovery signal resource region and sends a discovery signal at the selected resource according to the discovery signal transmission period of the corresponding ENB, interference on the allocated resources may increase owing to changes occurring at neighboring ENBs or movement of other proximate UEs. The UE may also experience difficulty in correctly sending a discovery signal using the assigned resource, when the amount of discovery signal resources allocated by the ENB changes because of a change in the number of D2D UEs managed by the ENB, when the number of UEs sending a discovery signal using the same resource increases, or when another UE sending a discovery signal using the same resource moves close to the UE. Hence, it is necessary for a UE to perform rescanning and reallocation by periodically measuring received signal strengths in the discovery signal resource region.

First Embodiment

The ENB may direct UEs in the cell to rescan the discovery signal resources or send the UEs one or more rescan periods ($T_{rescan}$) via a system information block (SIB) or higher layer signaling. In one embodiment, the ENB may send the UE an offset value indicating the start of rescanning.

Here, the rescan period ($T_{rescan}$) may be a positive integer multiple of the discovery signal transmission period ($T_{discovery}$) set by the ENB ($T_{rescan}=kT_{discovery}$, k≥1). When one or more rescan periods are received, the UE may select one of the rescan periods at random or according to the mobility state. The UE may also select a rescan period according to various other criteria. If the UE is aware of a predefined rescan period, it may perform rescanning without separately receiving a rescan period from the ENB.

In the LTE system, the ENB sends the UE mobility measurement parameters including one or more of measurement time ($T_{CRmax}$), threshold 1 ($N_{CR\_M}$) and threshold 2 ($N_{CR\_H}$) via SIB. The UE may determine its mobility state by use of the mobility measurement parameters. Here, the threshold values may be represented by the number of cells selected by the UE for the measurement time ($T_{CRmax}$). For example, if the number of cells selected by the UE for the measurement time is greater than threshold 1 ($N_{CR\_M}$) and less than threshold 2 ($N_{CR\_H}$), the UE may determine that it is in medium-mobility state. If the number of cells selected by the UE for the measurement time is greater than threshold 2 ($N_{CR\_H}$), the UE may determine that it is in high-mobility state. If otherwise, the UE may determine that it is in normal-mobility state. In general, radio channels undergo more substantial changes when the UE is in high-mobility state compared to when the UE is in normal-mobility state. That is, when the UE is in high-mobility state, it is expected that the correlation between the discovery signal resource used for the most recently sent discovery signal and the current discovery signal resource is very low. In other words, although a resource with the lowest received signal strength in the discovery signal resource region allocated by the ENB is selected for sending a discovery signal, for a UE in high-mobility state, it is highly probable that the received signal strength at the selected resource during the next discovery signal transmission period may be entirely different from the previous one. Hence, it is necessary for a UE in high-mobility state to more frequently rescan the discovery signal resource region compared to a UE in normal-mobility state.

Therefore, the UE may select a rescan period for discovery signal resources according to its mobility state from among multiple rescan periods received from the ENB via SIB or higher layer signaling. For example, when a UE having received multiple rescan periods is in high-mobility state, it may select the shortest one of the rescan periods. When the ENB provides the UE with information on rescan periods based on mobility state as shown in Table 1, the UE may set a rescan period according to the mobility state thereof. Alternatively, when rescan periods based on mobility state are predefined as shown in Table 1, the UE may identify its mobility state and select a rescan period according to the identified mobility state without receiving information on rescan periods from the ENB.

TABLE 1

| Mobility state | Period |
| --- | --- |
| Normal-mobility state | $T_{rescan\_normal}$ |
| Medium-mobility state | $T_{rescan\_medium}$ |
| High-mobility state | $T_{rescan\_high}$ |

Table 1 illustrates rescan periods based on UE mobility state.

Meanwhile, multiple UEs in the same mobility state may have the same rescan period. If multiple UEs having the same rescan period suspend discovery signal transmission and rescan the discovery signal resource region at the same time, the UEs will fail to obtain correct measurement information such as received signal strengths in the discovery signal resource region. Hence, to disperse rescanning timings of UEs, it is necessary to configure UE-specific rescan offsets.

A UE-specific rescan offset may be determined by using UE-specific information such as UE identifier. For example, the rescan offset (x) for a UE may be set to the result of the modulo operation between the rescan period ($T_{rescan}$)

selected by or assigned to the UE and the identifier of the UE (UE_ID) (x=UE_ID mod $T_{rescan}$).

In one embodiment, the rescan offset may be determined on the basis of the information received from the ENB. The rescan period may also be changed according to the selected offset.

Here, the UE identifier (i.e. UE_ID) may be anyone of IDs available to a particular UE. For example, UE_ID may be an ID assigned uniquely to the UE such as International Mobile Subscriber Identity (IMSI), or be an ID assigned to the UE at the time of registration on the ENB or operator network, such as Temporary Mobile Subscriber Identity (TMSI), Packet-Temporary Mobile Subscriber Identity (P-TMSI), or Cell-Radio Network Temporary Identifier (C-RNTI). The rescan offset may also be determined by use of any UE-specific information other than UE_ID.

After setting a rescan offset (x), the UE performs rescanning according to the rescan period and rescan offset. That is, when the rescan period arrives, the UE may initiate rescanning after a duration corresponding to the rescan offset.

Figure 5:
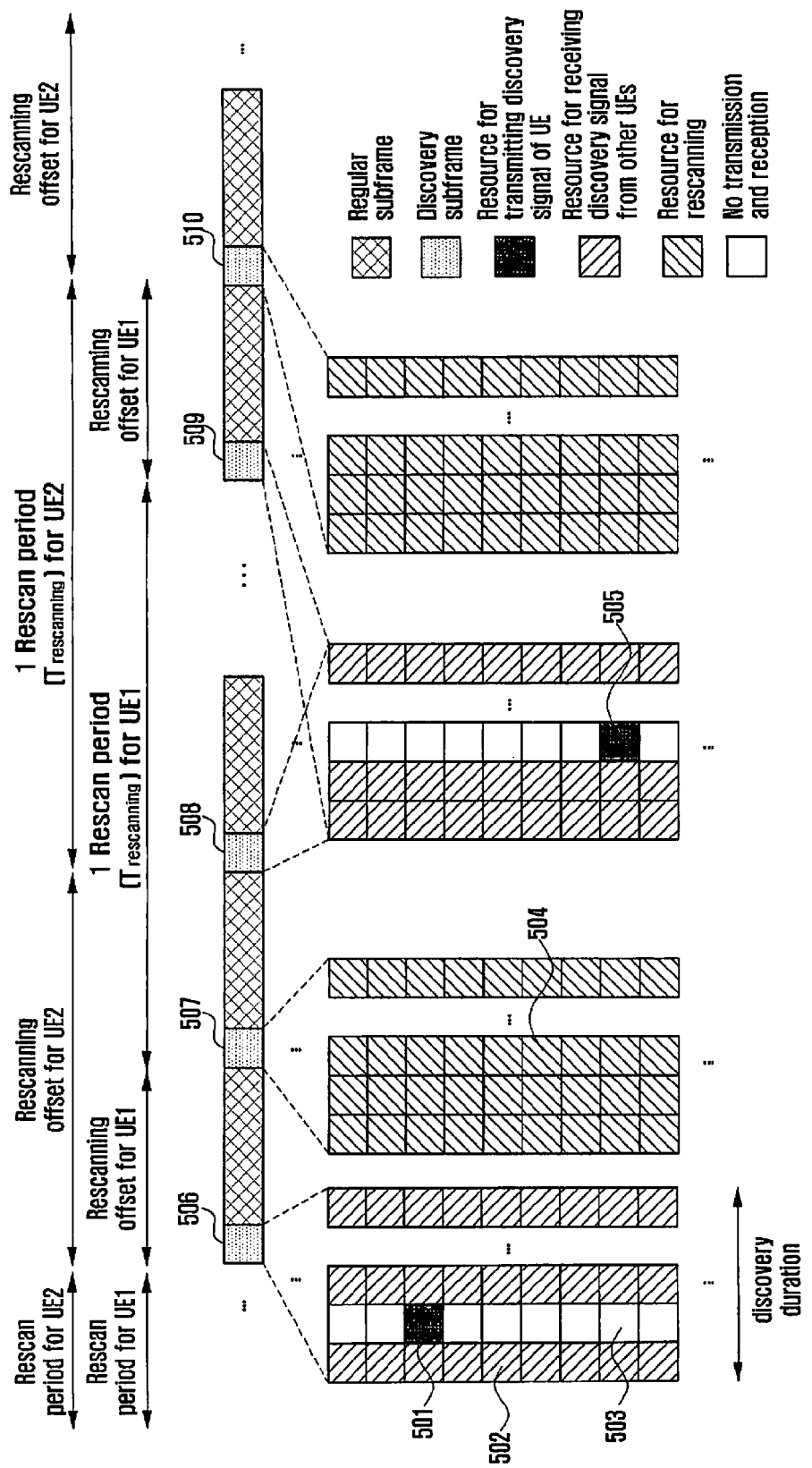
FIG. 5 illustrates rescanning operations from the viewpoint of UE 1 where the discovery signal transmission resource region is rescanned with discontinuation of discovery signal transmission.

FIG. 5 illustrates rescanning operations from the viewpoint of UE 1 where the discovery signal transmission resource region is rescanned with discontinuation of discovery signal transmission.

Referring to FIG. 5, the rescan periods for UE 1 and UE 2 arrive at D2D subframe 506. If there is no rescan offset, UE 1 and UE 2 will perform rescanning at the same time. When the rescan offset for UE 1 is set to 1 (x=1) and the rescan offset for UE 2 is set to 2 (x=2), UE 1 performs rescanning at D2D subframe 507. At this time, UE 2 may send and receive a discovery signal because its rescan offset is not reached. Thereafter, UE 2 performs rescanning at D2D subframe 508, and UE 1 sends a discovery signal using a discovery signal transmission resource determined after rescanning. As such, use of rescan offsets may significantly reduce the probability of simultaneous occurrences of rescanning by multiple UEs having the same rescan period. Here, when the rescan period arrives, the UE suspends discovery signal transmission and rescans the discovery signal resource region according to the rescan period and rescan offset.

With reference to FIG. 5, a more detailed description is given of rescanning of the discovery signal resource region from the viewpoint of UE 1. UEs, which have determined discovery signal transmission resources, rescan periods and rescan offsets, send discovery signals according to the discovery signal transmission period ($T_{discovery}$). Specifically, although the rescan period arrives at D2D subframe 506, UE 1 does not perform rescanning at D2D subframe 506 and sends a discovery signal using a discovery signal resource 501 according to its rescan offset. Here, UE 1 receives a discovery signal from another UE in the remaining region 502 except for the region 503 corresponding to the resource 501 used for discovery signal transmission.

Thereafter, when the rescan offset is reached at D2D subframe 507, UE 1 suspends discovery signal transmission at D2D subframe 507 and rescans the entire discovery signal resource region 504. UE 1 may also rescan only a part of the discovery signal resource region. During rescanning, UE 1 may measure received signal strengths at individual resources of the resource region (step 304 of FIG. 3). UE 1 may select a new discovery signal transmission resource on the basis of the measured received signal strength information. Here, UE 1 may select a discovery signal transmission resource with the lowest received signal strength, or may select a preset number of discovery signal transmission resources in order of increasing received signal strength (lowest first) and select one of the selected discovery signal transmission resources at random.

UE 1 may also select a discovery signal transmission resource at random without measuring the received signal strength. UE 1 may select a discovery signal transmission resource in various other ways. Thereafter, at D2D subframe 508 according to the discovery signal transmission period, UE 1 may send a discovery signal using a newly selected discovery signal resource 505 and receive a discovery signal from another UE in the remaining region except for the region corresponding to the resource 505 used for discovery signal transmission. After discovery signal transmission using the resource 505 and reception, UE 1 repeats the above operation at D2D subframes 509 and 510 according to the rescan period and rescan offset.

In the above description, radio resources used for discovery signal transmission in each discovery signal transmission period are logical radio resources, which may be mapped to physical radio resources according to a given rule. Hence, although logical radio resources may change or may not change in each discovery signal transmission period, the physical radio resource used by a UE for discovery signal transmission may differ in each discovery signal transmission period. Here, the physical radio resource actually used by the UE may be identified through the corresponding logical radio resource.

Figure 6:
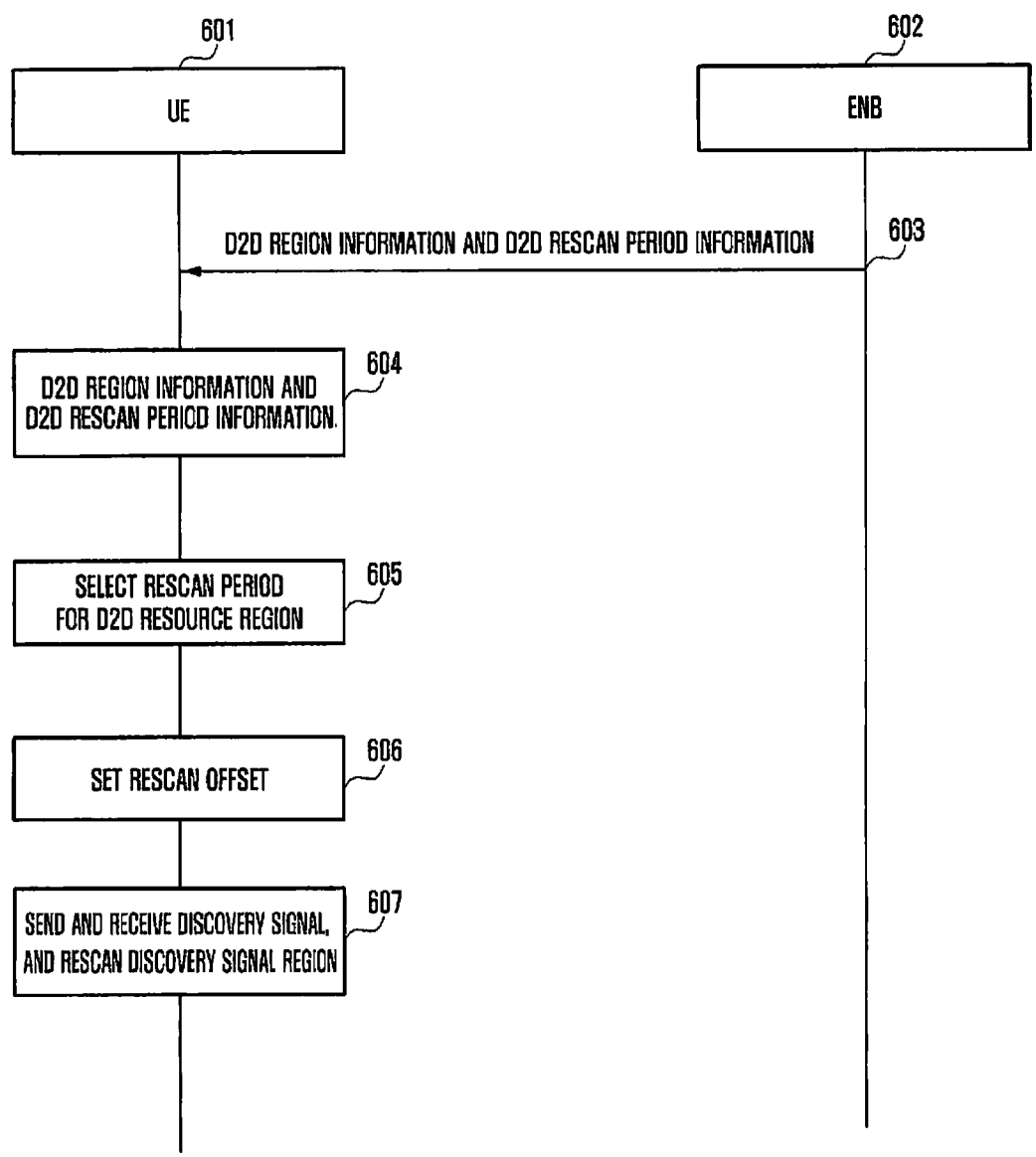
FIG. 6 illustrates a procedure whereby the ENB notifies the UE of information regarding the D2D region and rescan period.

FIG. 6 illustrates a procedure whereby the ENB notifies the UE of information regarding the D2D region and rescan period.

Referring to FIG. 6, the ENB 602 managing a D2D capable UE 601 sends SIB containing D2D region information and rescan period information, so that all UEs managed by the ENB 602 may receive SIB.

At step 603, the UE 601 receives SIB containing D2D region information and rescan period information.

At step 604, the UE 601 determines the D2D resource region and discovery signal transmission resource.

At step 605, the UE 601 selects the rescan period.

Upon selecting the rescan period for the D2D region, at step 606, the UE 601 determines the rescan offset by use of the selected rescan period and UE-specific information.

Thereafter, at step 607, the UE 601 sends or receives a discovery signal and performs rescanning of the discovery resource region according to the rescan period selected at steps 605 and 606.

Figure 7:
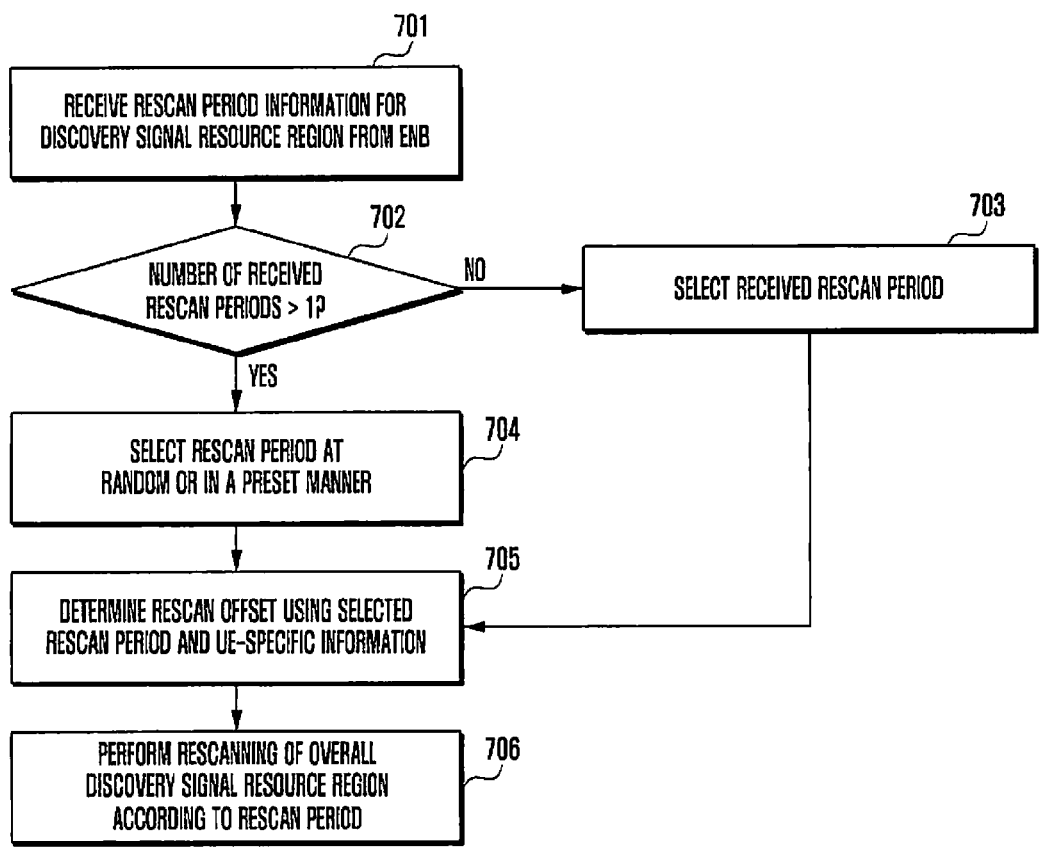
FIG. 7 illustrates a procedure whereby the UE selects a rescan period after receiving rescan period information for the discovery signal resource region from the ENB.

FIG. 7 illustrates a procedure whereby the UE selects a rescan period after receiving rescan period information for the discovery signal resource region from the ENB.

Referring to FIG. 7, at step 701, the UE receives rescan period information for the discovery signal resource region from the ENB.

At step 702, the UE checks whether the number of received rescan periods is greater than one. If the number of received rescan periods is one, at step 703, the UE selects the received rescan period as the rescan period for the discovery signal resource region.

If the number of received rescan periods is greater than one, at step 704, the UE selects one of the received rescan periods at random or according to a preset scheme.

At step 705, the UE determines the rescan offset by use of the rescan period selected at step 703 or 704 and UE-specific information.

At step 706, the UE suspends discovery signal transmission and performs rescanning of the discovery signal resource region according to the rescan period determined through steps 703, 704 and 705.

Second Embodiment

The ENB may direct UEs in the cell to rescan the discovery signal resources or send the UEs one or more rescan periods ($T_{rescan}$) via a system information block (SIB) or higher layer signaling. Here, the rescan period ($T_{rescan}$) may be a positive integer multiple of the discovery signal transmission period ($T_{discovery}$) set by the ENB ($T_{rescan}=kT_{discovery}$, $k\geq 1$). When one or more rescan periods are received, the UE may select one of the rescan periods at random or according to the mobility state. The UE may also select a rescan period according to various other criteria. If the UE is aware of a predefined rescan period, it may perform rescanning without separately receiving a rescan period from the ENB.

In the LTE system, the ENB sends the UE mobility measurement parameters including measurement time ($T_{CRmax}$), threshold 1 ($N_{CR\_M}$) and threshold 2 ($N_{CR\_H}$) via SIB. The UE may determine its mobility state by use of the mobility measurement parameters. Here, the threshold values may be represented by the number of cells selected by the UE for the measurement time ($T_{CRmax}$). For example, if the number of cells selected by the UE for the measurement time is greater than threshold 1 ($N_{CR\_M}$) and less than threshold 2 ($N_{CR\_H}$), the UE may determine that it is in medium-mobility state. If the number of cells selected by the UE for the measurement time is greater than threshold 2, the UE may determine that it is in high-mobility state. If otherwise, the UE may determine that it is in normal-mobility state. In general, radio channels undergo more substantial changes when the UE is in high-mobility state compared to when the UE is in normal-mobility state. That is, for a UE in high-mobility state, it is expected that the correlation between the discovery signal resource used for the most recently sent discovery signal and the current discovery signal resource is very low. In other words, although a resource with the lowest received signal strength in the discovery signal resource region allocated by the ENB is selected for sending a discovery signal, for a UE in high-mobility state, it is highly probable that the received signal strength at the selected resource during the next discovery signal transmission period may be entirely different from the previous one. Hence, it is necessary for a UE in high-mobility state to more frequently rescan the discovery signal resource region compared to a UE in normal-mobility state.

Therefore, the UE may select a rescan period for discovery signal resources according to its mobility state from among multiple rescan periods received from the ENB via SIB or higher layer signaling. For example, when a UE having received multiple rescan periods is in high-mobility state, it may select the shortest one of the rescan periods. When the ENB provides the UE with information on rescan periods based on mobility state as shown in Table 1, the UE may set a rescan period according to the mobility state thereof. Alternatively, when rescan periods based on mobility state are predefined as shown in Table 1, the UE may identify its mobility state and select a rescan period according to the identified mobility state without receiving information on rescan periods from the ENB.

Meanwhile, multiple UEs in the same mobility state may have the same rescan period. If multiple UEs having the same rescan period suspend discovery signal transmission and rescan the discovery signal resource region at the same time, the UEs will fail to obtain correct measurement information such as received signal strengths in the discovery signal resource region. Hence, to disperse rescanning timings of UEs, it is necessary to configure UE-specific rescan offsets.

A UE-specific rescan offset may be determined by using UE-specific information such as UE identifier. For example, the rescan offset (x) for a UE may be set to the result of the modulo operation between the rescan period ($T_{rescan}$) selected by or assigned to the UE and the identifier of the UE (UE_ID) (x=UE_ID mod $T_{rescan}$).

Here, the UE identifier (i.e. UE_ID) may be anyone of IDs available to a particular UE. For example, UE_ID may be an ID assigned uniquely to the UE such as International Mobile Subscriber Identity (IMSI), or be an ID assigned to the UE at the time of registration on the ENB or operator network, such as Temporary Mobile Subscriber Identity (TMSI), Packet-Temporary Mobile Subscriber Identity (P-TMSI), or Cell-Radio Network Temporary Identifier (C-RNTI). The rescan offset may also be determined by use of any UE-specific information other than UE_ID.

After setting a rescan offset (x), the UE performs rescanning according to the rescan period and rescan offset. That is, when the rescan period arrives, the UE may initiate rescanning after a duration corresponding to the rescan offset.

Figure 8:
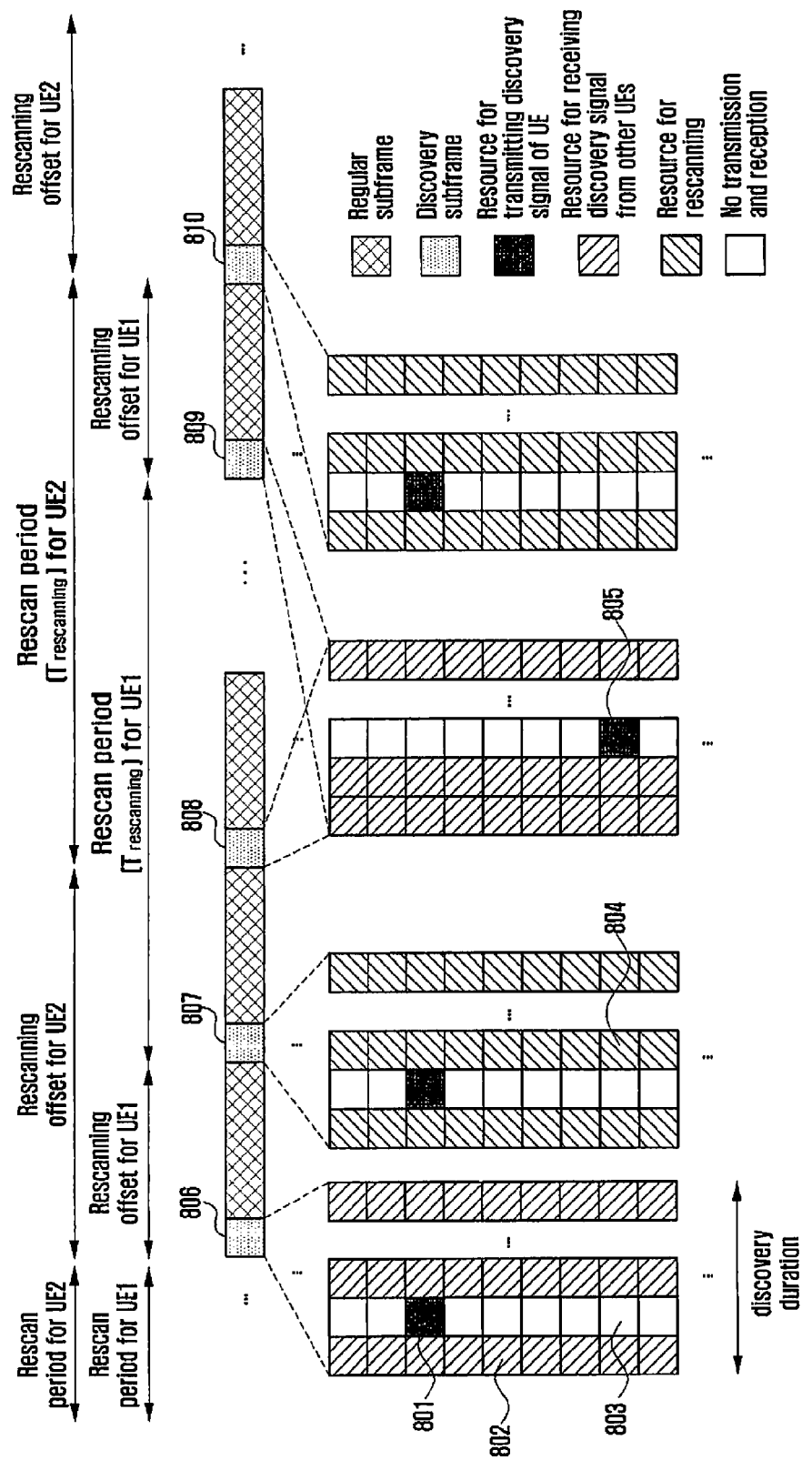
FIG. 8 illustrates rescanning operations from the viewpoint of UE 1 where the discovery signal transmission resource region is rescanned along with discovery signal transmission.

FIG. 8 illustrates rescanning operations from the viewpoint of UE 1 where the discovery signal transmission resource region is rescanned along with discovery signal transmission.

Referring to FIG. 8, the rescan periods for UE 1 and UE 2 arrive at D2D subframe 806. If there is no rescan offset, UE 1 and UE 2 will perform rescanning at the same time. When the rescan offset for UE 1 is set to 1 (x=1) and the rescan offset for UE 2 is set to 2 (x=2), UE 1 performs rescanning at D2D subframe 807. At this time, UE 2 may send and receive a discovery signal. Thereafter, UE 2 performs rescanning at D2D subframe 808, and UE 1 sends a discovery signal using a discovery signal transmission resource determined after rescanning. As such, use of rescan offsets may significantly reduce the probability of simultaneous occurrences of rescanning by multiple UEs having the same rescan period. Here, when the rescan period ($T_{rescan}$) arrives as at D2D subframe 807, unlike the first embodiment, the UE may rescan the discovery signal resource region while sending a discovery signal.

With reference to FIG. 8, a more detailed description is given of rescanning of the discovery signal resource region from the viewpoint of UE 1. UEs, which have determined discovery signal transmission resources, rescan periods and rescan offsets, send discovery signals according to the discovery signal transmission period ($T_{discovery}$). Specifically, although the rescan period arrives at D2D subframe 806, UE 1 does not perform rescanning at D2D subframe 806 owing to its rescan offset and sends a discovery signal using a discovery signal resource 801.

Here, UE 1 receives a discovery signal from another UE in the remaining region 802 except for the region 803 corresponding to the resource 801 used for discovery signal transmission. Thereafter, when the rescan offset is reached at D2D subframe 807, unlike the first embodiment, UE 1 sends a discovery signal using the same resource used at D2D subframe 806 and rescans the discovery signal reception resource region as indicated by indicia 804. Here, UE 1 may rescan only a part of the discovery signal reception resource region.

During rescanning, UE 1 may measure received signal strengths at individual resources of the resource region (step 304 of FIG. 3). UE 1 may select a new discovery signal transmission resource on the basis of the measured received signal strength information. Here, UE 1 may select a discovery signal transmission resource with the lowest received signal strength, or may select a preset number of discovery signal transmission resources in order of increasing received signal strength (lowest first) and select one of the selected discovery signal transmission resources at random. UE 1 may also select a discovery signal transmission resource at random without measuring the received signal strength. UE 1 may select a discovery signal transmission resource in various other ways. Thereafter, at D2D subframe 808 according to the discovery signal transmission period, UE 1 may send a discovery signal using a newly selected discovery signal resource 805 and receive a discovery signal from another UE in the remaining region except for the region corresponding to the resource 805 used for discovery signal transmission. After discovery signal transmission using the resource 805 and reception, UE 1 repeats the above operation at D2D subframes 809 and 810 according to the rescan period and rescan offset.

As described above, the discovery signal reception region is rescanned while maintaining the discovery signal transmission resource, not causing delay of discovery signal transmission. Hence, compared with the first embodiment, the UE may be more easily discovered by a proximate UE.

In the above description, radio resources used for discovery signal transmission in each discovery signal transmission period are logical radio resources, which may be mapped to physical radio resources according to a given rule. Hence, although logical radio resources may change or may not change in each discovery signal transmission period, the physical radio resource used by a UE for discovery signal transmission may differ in each discovery signal transmission period. Here, the physical radio resource actually used by the UE may be identified through the corresponding logical radio resource.

Figure 9:
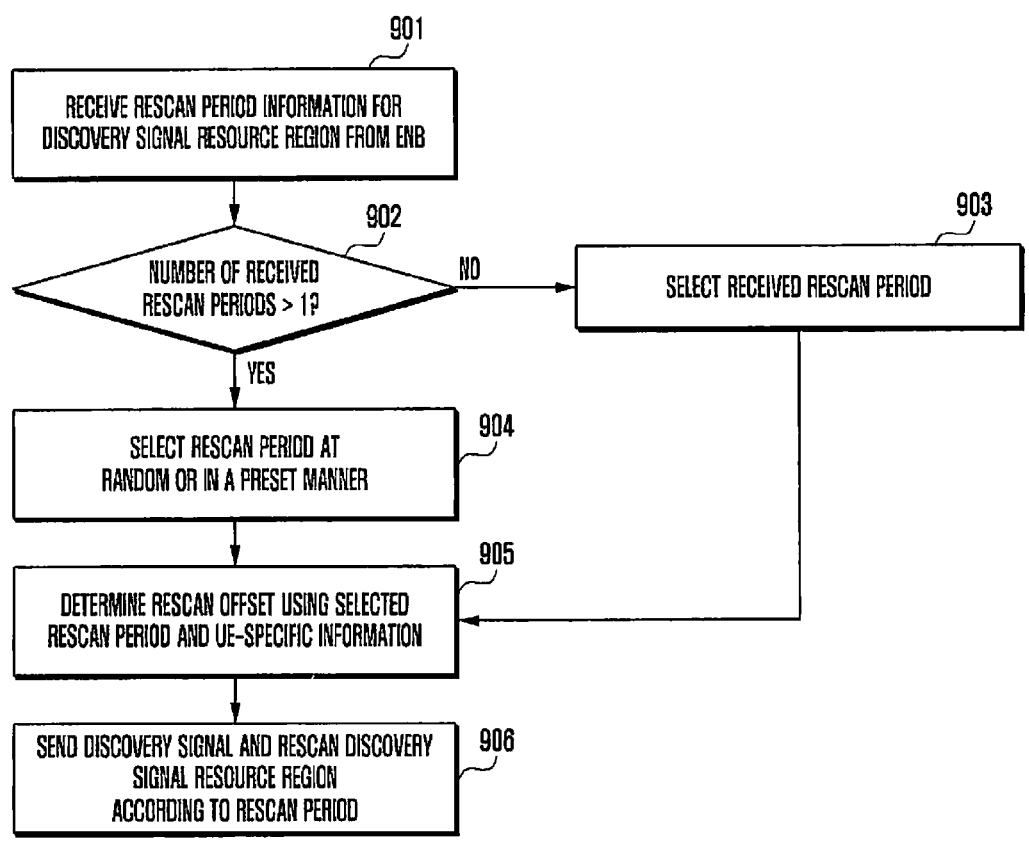
FIG. 9 illustrates a procedure whereby the UE selects a rescan period after receiving rescan period information for the discovery signal resource region from the ENB.

FIG. 9 illustrates a procedure whereby the UE selects a rescan period after receiving rescan period information for the discovery signal resource region from the ENB.

Referring to FIG. 9, at step 901, the UE receives rescan period information for the discovery signal resource region from the ENB.

At step 902, the UE checks whether the number of received rescan periods is greater than one. If the number of received rescan periods is one, at step 903, the UE selects the received rescan period as the rescan period for the discovery signal resource region.

If the number of received rescan periods is greater than one, at step 904, the UE selects one of the received rescan periods at random or according to a preset scheme.

At step 905, the UE determines the rescan offset by use of the rescan period selected at step 903 or 904 and UE-specific information.

At step 906, the UE rescans the discovery signal reception resource region while transmitting a discovery signal using the previous discovery signal transmission resource according to the rescan period determined through steps 903, 904 and 905.

Third Embodiment

The UE may examine the rescan period in accordance with a change in the discovery signal transmission resources of the ENB. To reduce unnecessary consumption of discovery signal resources, the ENB may change the region of allocated D2D resources, in particular the region of discovery signal transmission resources, on the basis of information on D2D UEs in the cell. When the discovery signal resource region of the ENB is changed, UEs may rescan the changed discovery signal resource region and send or receive discovery signals using new resources.

In a wireless communication network such as the LTE system, a UE may be in connected mode or idle mode with respect to the corresponding ENB. When a UE is in connected mode, it has achieved synchronization with the ENB in the downlink and uplink and may be involved in downlink and uplink transmissions. When data transmission or reception is not necessary, the UE may be in idle mode, where it maintains only downlink synchronization with the ENB to receive minimum information from the ENB.

Here, the ENB may determine the amount of discovery signal transmission resources on the basis of information on UEs in connected mode. For example, the ENB may count the number of UEs requesting or performing D2D communication and determine the region of discovery signal transmission resources accordingly. That is, when the number of UEs requesting or performing D2D communication is decreased, the ENB may reduce the region of allocated discovery signal transmission resources in the frequency or time domain, preventing unnecessary consumption of resources. When the number of UEs requesting or performing D2D communication is increased, the ENB may increase the region of discovery signal transmission resources in the frequency or time domain for smooth D2D communication. The ENB may determine the total amount of resources used for D2D signal transmission according to the above criterion.

The ENB may also determine the amount of discovery signal transmission resources on the basis of information on UEs in connected mode and in idle mode. The ENB may periodically measure the reception power in the discovery signal resource region. The ENB may measure the level of reception power at the current discovery signal resource using the measured reception power and estimate the number of UEs sending a discovery signal. In general, when the reception power is high, the ENB may increase the region of discovery signal resources in the frequency or time domain. When the reception power is low, the ENB may reduce the region of discovery signal resources in the frequency or time domain.

Upon determining to adjust the region of discovery signal transmission resources, the ENB may send UEs information regarding the changed resource region. More specifically, the ENB may notify all UEs in the cell of changes in the discovery signal resource region via SIB or higher layer signaling. The UE may compare the existing discovery signal resource region information with the discovery signal resource region information newly received from the ENB to identify a change in the discovery signal transmission resources. Upon determining that the discovery signal transmission resource region is changed on the basis of signals from the ENB, the UE may rescan the changed discovery signal resource region. Hence, upon determining that the discovery signal resource region is changed, the UE may perform rescanning of the changed discovery signal transmission resource region at the very next discovery signal transmission timing or according to the selected rescan period. The UE may modify the selected rescan period in consideration of the changed discovery signal resource region and perform rescanning of the changed discovery signal resource region according to the modified rescan period.

If the discovery signal transmission resource region newly notified by the ENB is less than the existing one, a UE having used a transmission resource belonging to the existing resource region but not belonging to the new resource region does not have a resource for sending a discovery signal. Hence, such a UE may suspend discovery signal transmission at the very next discovery signal transmission timing and rescan the changed or new discovery signal transmission resource region.

In such a case, if the UE has received multiple rescan periods, it may perform rescanning according to the shortest one of the rescan periods.

When the ENB changes the discovery signal resource region within a preset time ($T_{change}$) after notifying the UE of discovery signal resource region change, the UE may rescan the discovery signal transmission resource region existing up to the preset time ($T_{change}$). In this case, the UE may perform rescanning by selecting a specific point in time in the discovery duration before the preset time ($T_{change}$) or by setting a temporary rescan offset (x) based on the discovery signal resource change time ($T_{change}$) and UE-specific information (e.g. x=UE_ID mod $T_{change}$, similarly to determination of the rescan offset for the first and second embodiments). Here, the ENB may notify the UE of the discovery signal resource change time ($T_{change}$) via SIB or higher layer signaling.

As described before in the first and second embodiments, the UE identifier (i.e. UE_ID) may be anyone of IDs available to a particular UE. For example, UE_ID may be an ID assigned uniquely to the UE such as International Mobile Subscriber Identity (IMSI), or be an ID assigned to the UE at the time of registration on the ENB or operator network, such as Temporary Mobile Subscriber Identity (TMSI), Packet-Temporary Mobile Subscriber Identity (P-TMSI), or Cell-Radio Network Temporary Identifier (C-RNTI). The rescan offset may also be determined by use of any UE-specific information other than UE_ID.

If the discovery signal transmission resource region newly notified by the ENB is less than the existing one, a UE having used a transmission resource belonging to the existing resource region but not belonging to the new resource region does not have a resource for sending a discovery signal. Hence, such as a UE cannot perform rescanning while sending a discovery signal as in the case of the second embodiment. In this situation, the UE may suspend discovery signal transmission and perform rescanning of the discovery signal resources as in the case of the second embodiment.

Here, although the discovery signal transmission resource region newly notified by the ENB is less than the existing one, a UE having used a transmission resource belonging to both the existing resource region and the new resource region may send a discovery signal using the existing transmission resource without changing or rescanning the discovery signal resource region. Such a UE may perform rescanning according to the existing rescan period. As described above, when the resource region is changed, only a UE having used a transmission resource belonging to the old resource region but not belonging to the new resource region has to perform rescanning of the resource region. Hence, it is possible to avoid unnecessary rescanning and minimize rescan collisions between UEs.

If the discovery signal transmission resource region newly notified by the ENB is greater than the existing one, to correctly use the added resources, UEs has to rescan the new discovery signal transmission resource region. Here, the UE may perform rescanning according to the existing rescan period as in the case of the first embodiment or second embodiment. For more rapid rescanning of the changed discovery signal resource region with added resources, the UE may perform rescanning at the very next discovery signal transmission period or according to a modified rescan period. Here, the UE may reduce the existing rescan period by a desired proportion, or the ENB may notify the UE of the amount of change in the rescan period via SIB or higher layer signaling. The UE may change the existing rescan period by use of a preset ratio such as the ratio of the new discovery resource region to the existing discovery resource region. For example, if the ENB notifies the UE of 0.5 as the amount of change in the rescan period, the UE may reset the existing rescan period ($T_{rescan}$) to $0.5*T_{rescan}$ and perform rescanning using the updated rescan period. In the event that the discovery signal resource region is changed, it is preferable to shorten the existing rescan period. However, the rescan period may also be unchanged or lengthened.

As described above, when the discovery signal transmission resource region newly notified by the ENB is greater than the existing one, the UE may perform rescanning of the discovery signal resource region while suspending discovery signal transmission as in the case of the first embodiment or while transmitting a discovery signal as in the case of the second embodiment.

Meanwhile, if multiple UEs having the same rescan period suspend discovery signal transmission and rescan the discovery signal resource region at the same time, the UEs will fail to obtain correct measurement information such as received signal strengths in the discovery signal resource region. Hence, to disperse rescanning timings of UEs, it is necessary to configure UE-specific rescan offsets.

A UE-specific rescan offset may be determined by using UE-specific information such as UE identifier. For example, the rescan offset (x) for a UE may be set to the result of the modulo operation between the rescan period ($T_{rescan}$) selected by or assigned to the UE and the identifier of the UE (UE_ID) (x=UE_ID mod $T_{rescan}$).

Here, the UE identifier (i.e. UE_ID) may be anyone of IDs available to a particular UE. For example, UE_ID may be an ID assigned uniquely to the UE such as International Mobile Subscriber Identity (IMSI), or be an ID assigned to the UE at the time of registration on the ENB or operator network, such as Temporary Mobile Subscriber Identity (TMSI), Packet-Temporary Mobile Subscriber Identity (P-TMSI), or Cell-Radio Network Temporary Identifier (C-RNTI). The rescan offset may also be determined by use of any UE-specific information other than UE_ID.

After setting a rescan offset (x), the UE performs rescanning according to the rescan period and rescan offset. That is, when the rescan period arrives, the UE may initiate rescanning after a duration corresponding to the rescan offset. For example, referring to FIG. 5, the rescan periods for UE 1 and UE 2 arrive at D2D subframe 506. If there is no rescan offset, UE 1 and UE 2 will perform rescanning at the same time. When the rescan offset for UE 1 is set to 1 (x=1) and the rescan offset for UE 2 is set to 2 (x=2), UE 1 suspends discovery signal transmission and performs rescanning at D2D subframe 507. At this time, UE 2 may send and receive a discovery signal. Thereafter, UE 2 performs rescanning at D2D subframe 508, and UE 1 sends a discovery signal using a discovery signal transmission resource determined after rescanning. As such, use of rescan offsets may significantly reduce the probability of simultaneous occurrences of rescanning by multiple UEs having the same rescan period.

In one embodiment, after performing rescanning using a modified rescan period as a response to a signal indicating occurrence of a change in the D2D communication resource from the ENB, the UE may perform rescanning by using one or more of the rescan period and rescan offset prepared for normal situations.

Figure 10:
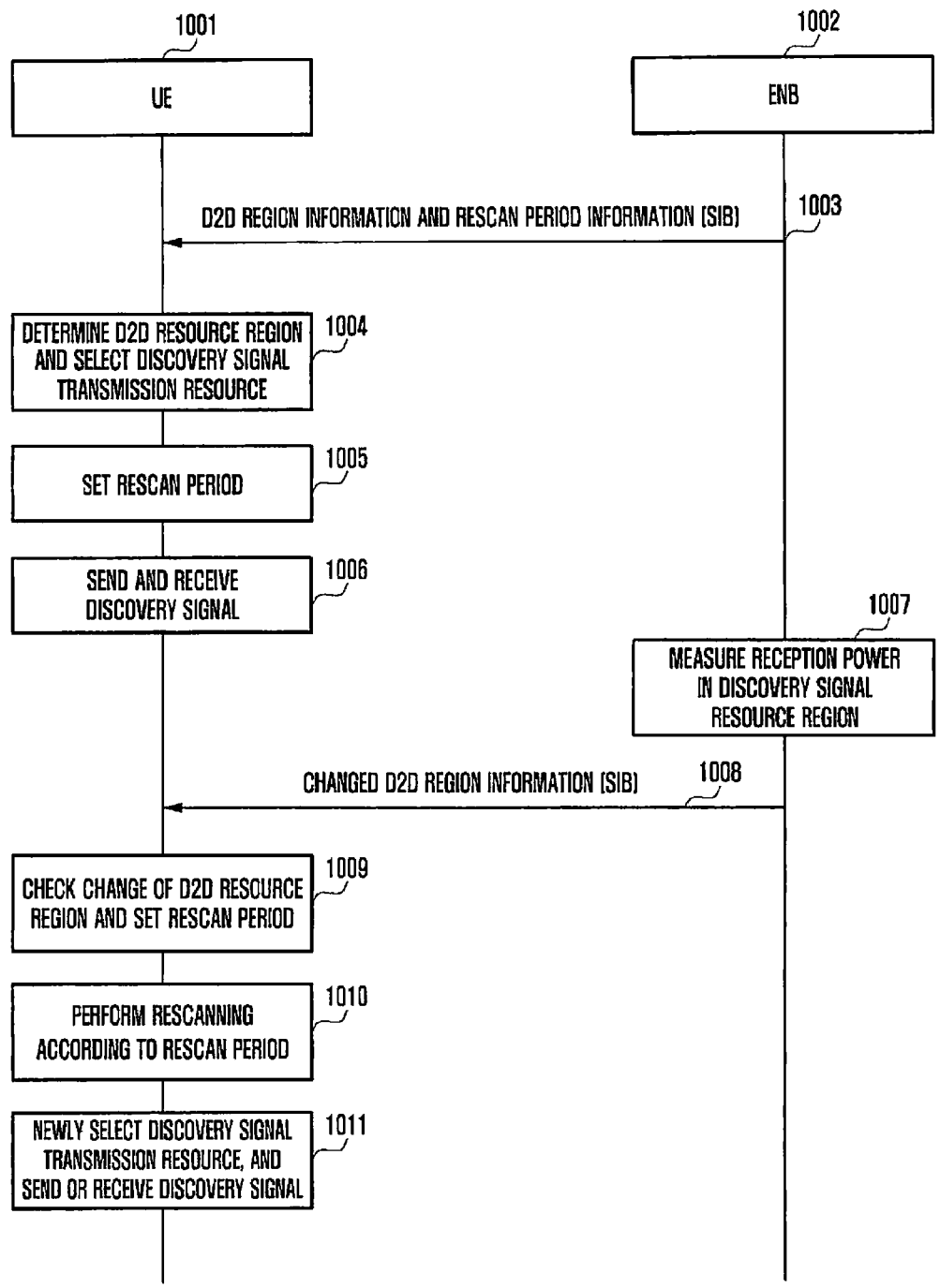
FIG. 10 illustrates operations between the UE and ENB when the discovery signal resource region is changed by the ENB.

FIG. 10 illustrates operations between the UE and ENB when the discovery signal resource region is changed by the ENB.

Referring to FIG. 10, at step 1003, the ENB 1002 managing a D2D capable UE 1001 sends D2D region information and rescan period information via SIB, so that all UEs managed by the ENB 1002 may receive the information.

At step 1004, the UE 1001 receives SIB containing D2D region information and rescan period information from the ENB 1002, determines the D2D resource region, and selects a discovery signal transmission resource.

At step 1005, the UE 1001 sets a rescan period.

At step 1006, the UE 1001 sends and receives a discovery signal.

At step 1007, the ENB 1002 determines whether to change the discovery signal resource region on the basis of levels of reception power of UE transmissions in the discovery signal resource region.

If there is a need to change the D2D resource region, at step 1008, the ENB 1002 sends UEs information on the changed D2D resource region. In addition to the changed D2D resource region information, the ENB 1002 may notify UEs of the time at which the discovery signal resources are actually changed.

Upon reception of new D2D resource region information, at step 1009, the UE 1001 checks presence of a change in the D2D resource region and sets a rescan period according to the checked result. At step 1010, the UE 1001 performs rescanning according to the set rescan period.

At step 1011, the UE 1001 selects a discovery signal transmission resource according to the rescanning result, and sends or receives a discovery signal.

Figure 11:
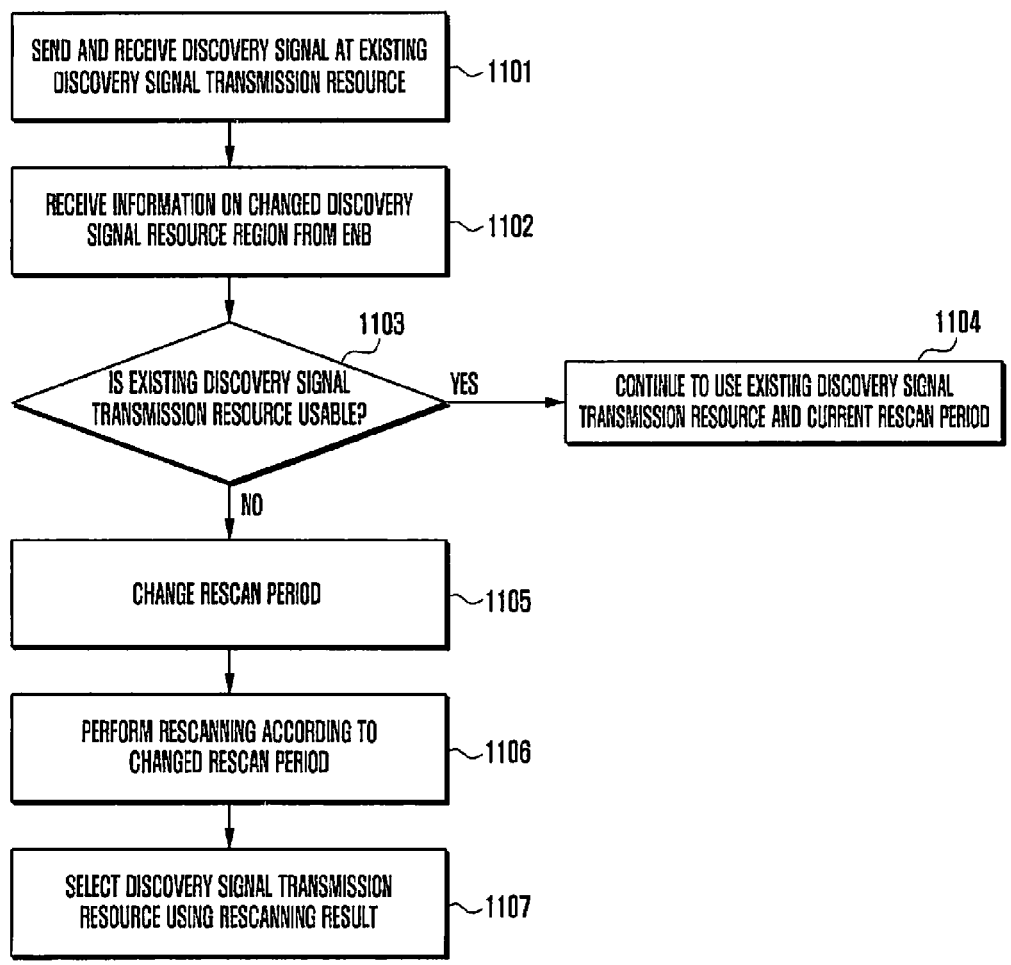
FIG. 11 illustrates a procedure whereby the UE selects a rescan period after receiving a changed discovery signal resource region from the ENB.

FIG. 11 illustrates a procedure whereby the UE selects a rescan period after receiving a changed discovery signal resource region from the ENB.

Referring to FIG. 11, at step 1101, the UE sends and receives a discovery signal at a discovery signal transmission resource selected using existing information on the discovery signal resource region.

At step 1102, the UE receives new information on the changed discovery signal resource region from the ENB. At step 1103, the UE compares the existing discovery signal transmission resource with the changed discovery signal resource region.

If the existing discovery signal transmission resource belongs to the changed discovery signal resource region, at step 1104, the UE continues to use the existing discovery signal transmission resource and the current rescan period.

If the existing discovery signal transmission resource does not belong to the changed discovery signal resource region, at step 1105, the UE changes the rescan period.

Thereafter, at step 1106, the UE performs rescanning of the changed discovery signal resource region according to the changed rescan period.

At step 1107, the UE selects a discovery signal transmission resource according to the rescanning result, and sends or receives a discovery signal.

Fourth Embodiment

A UE may examine the rescan period on the basis of information obtained through discovery signal reception. The UE may receive a discovery signal from another UE in the remaining part of the discovery signal resource region excluding the resources used by the UE for discovery signal transmission or switching between transmission and reception. Here, the UE may obtain information on the received signal strength in the discovery signal reception region through discovery signal reception. The UE may also obtain information on proximate UEs such as UE IDs through discovery signal reception.

When the difference between the previous received signal strength in the discovery signal reception region and the new received signal strength is greater than a threshold value, the UE may change the rescan period and rescan the discovery signal resource region. Here, the threshold value may be predefined in the UE or be notified by the ENB to the UE via SIB or higher layer signaling. If the difference is greater than the threshold value, the UE may change the rescan period and perform rescanning of the discovery signal resource region accordingly.

Alternatively, when the difference between the previous proximate UE information obtained via discovery signal reception and the new proximate UE information is greater than a preset threshold, the UE may change the rescan period and rescan the discovery signal resource region. Here, the threshold value may be predefined in the UE or be notified by the ENB to the UE via SIB or higher layer signaling.

For example, when a UE sending and receiving a discovery signal is moved from the inside of a building to the outside thereof, it is expected that the received signal strength or proximate UE information obtained at the inside of the building differs from that obtained at the outside thereof. In other words, as it is highly probable that information on the received signal strength or proximate UEs obtained via discovery signal reception at the inside of the building significantly differs from that obtained at the outside thereof, it is necessary for the UE to recognize a change in the discovery signal transmission resource. The UE may determine whether to rescan or to select a rescan period and perform rescanning of the discovery signal resource region on the basis of a change in the information obtained via discovery signal reception.

As such, the UE may change the rescan period by use of the information obtained through discovery signal reception. Here, the UE may change the rescan period by a desired proportion, or the ENB may notify the UE of the amount of change in the rescan period via SIB or higher layer signaling. The UE may change the rescan period by using the information obtained through discovery signal reception in a preset manner.

For example, if the new reception power measured in the discovery signal reception region shows a difference of −3 dB from the previous reception power, the UE may reduce the rescan period by half ($0.5*T_{rescan}$). If the new reception power measured in the discovery signal reception region shows a difference of +3 dB from the previous reception power, the UE may double the existing rescan period ($2*T_{rescan}$) or continue to use the existing rescan period.

Meanwhile, if multiple UEs having the same rescan period suspend discovery signal transmission and rescan the discovery signal resource region at the same time, the UEs will fail to obtain correct measurement information such as received signal strengths in the discovery signal resource region. Hence, to disperse rescanning timings of UEs, it is necessary to configure UE-specific rescan offsets.

A UE-specific rescan offset may be determined by using UE-specific information such as UE identifier. For example, the rescan offset (x) for a UE may be set to the result of the modulo operation between the rescan period ($T_{rescan}$)

selected by or assigned to the UE and the identifier of the UE (UE_ID) ($x = UE\_ID \mod T_{rescan}$).

Here, the UE identifier (i.e. UE_ID) may be anyone of IDs available to a particular UE. For example, UE_ID may be an ID assigned uniquely to the UE such as International Mobile Subscriber Identity (IMSI), or be an ID assigned to the UE at the time of registration on the ENB or operator network, such as Temporary Mobile Subscriber Identity (TMSI), Packet-Temporary Mobile Subscriber Identity (P-TMSI), or Cell-Radio Network Temporary Identifier (C-RNTI). The rescan offset may also be determined by use of any UE-specific information other than UE_ID.

After setting a rescan offset (x), the UE performs rescanning according to the rescan period and rescan offset. That is, when the rescan period arrives, the UE may initiate rescanning after a duration corresponding to the rescan offset. For example, referring to FIG. 5, the rescan periods for UE 1 and UE 2 arrive at D2D subframe 506. If there is no rescan offset, UE 1 and UE 2 will perform rescanning at the same time. When the rescan offset for UE 1 is set to 1 (x=1) and the rescan offset for UE 2 is set to 2 (x=2), UE 1 suspends discovery signal transmission and performs rescanning at D2D subframe 507. At this time, UE 2 may send and receive a discovery signal. Thereafter, UE 2 performs rescanning at D2D subframe 508, and UE 1 sends a discovery signal using a discovery signal transmission resource determined after rescanning. As such, use of rescan offsets may significantly reduce the probability of simultaneous occurrences of rescanning by multiple UEs having the same rescan period.

After selecting the rescan period, when the rescan period arrives, the UE may perform rescanning of the discovery signal resources while suspending discovery signal transmission as in the case of the first embodiment or while transmitting a discovery signal as in the case of the second embodiment.

Figure 12:
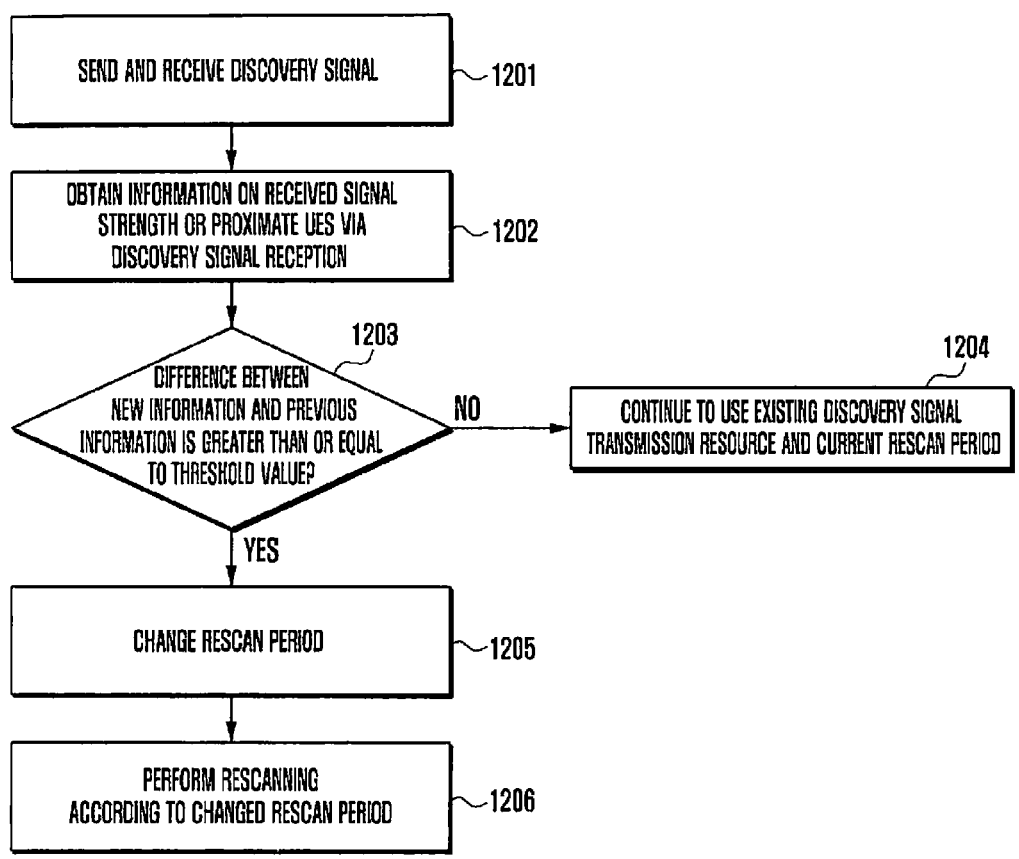
FIG. 12 illustrates a procedure whereby the UE changes the rescan period upon detection of a change in the proximate UE information via discovery signal reception.

FIG. 12 illustrates a procedure whereby the UE changes the rescan period upon detection of a change in the proximate UE information via discovery signal reception.

Referring to FIG. 12, at step 1201, the UE sends and receives a discovery signal using existing information on the discovery signal resource region.

At step 1202, the UE obtains new information regarding the received signal strength or proximate UEs via reception of a discovery signal.

At step 1203, the UE compares the new information obtained via discovery signal reception with the previous information to identify a difference therebetween.

If the difference between the new information and previous information is greater than or equal to a threshold value predefined or notified by the ENB via SIB or higher layer signaling, at step 1205, the UE determines that the location of the UE or proximate UE is changed and modifies the existing rescan period.

At step 1206, the UE performs rescanning according to the changed rescan period. If the difference between the new information and previous information is less than the threshold value predefined or notified by the ENB via SIB or higher layer signaling, at step 1204, the UE performs rescanning of the discovery signal resource region by using the existing discovery signal resource and existing rescan period.

Figure 13:
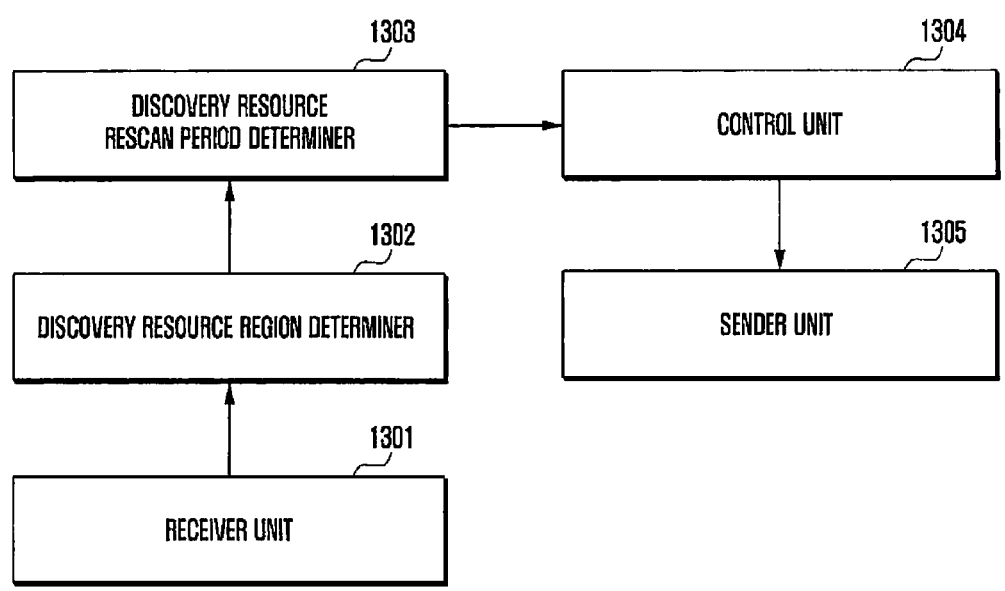
FIG. 13 is a block diagram of a user equipment according to an embodiment of the present invention.

FIG. 13 is a block diagram of a user equipment according to an embodiment of the present invention.

Referring to FIG. 13, the UE may include a receiver unit 1301, a discovery resource region determiner 1302, a discovery resource rescan period determiner 1303, a control unit 1304, and a sender unit 1305. In FIG. 13, only essential components for the present invention are shown, and the separation between components is only for illustration. The discovery resource region determiner 1302 may include a decision mechanism that identifies the region of discovery resources allocated by the ENB and identifies a change of the region of discovery resources. The discovery resource rescan period determiner 1303 may include a component to select a rescan period for rescanning operation of the present invention.

Figure 14:
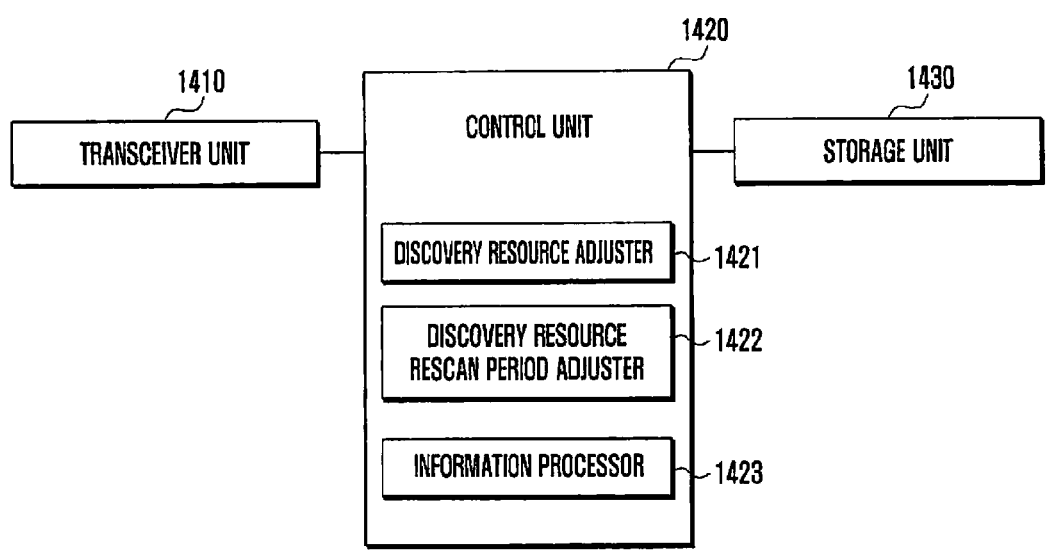
FIG. 14 is a block diagram of a base station according to an embodiment of the present invention.

FIG. 14 is a block diagram of a base station according to an embodiment of the present invention.

Referring to FIG. 14, the ENB may include a transceiver unit 1410, a control unit 1420, and a storage unit 1430. The transceiver unit 1410 performs signaling with UEs in connected mode and sends system information to UEs in the cell. To handle tasks related to embodiments of the present invention, the control unit 1420 may include a discovery resource adjuster 1421, a discovery resource rescan period adjuster 1422, and an information processor 1423 to send updated discovery resource information or to allocate discovery signal resources to UEs. The storage unit 1430 may store various information and programs needed for ENB operations related to embodiments of the present invention.

Hereinabove, exemplary embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method of transmitting and receiving signals for a terminal in a mobile communication system, the method comprising:
   receiving discovery signal configuration information including period information for rescanning a discovery signal;
   scanning a discovery signal resource region determined based on the discovery signal configuration information;
   transmitting a discovery signal on a resource of the discovery signal resource region selected based on the scanning result; and
   rescanning the discovery signal resource region based on at least one of the discovery signal configuration information and the scanning result.

2. The method of claim 1, wherein transmitting a discovery signal comprises scanning the discovery signal resource region except for the selected resource.

3. The method of claim 1, wherein receiving discovery signal configuration information comprises receiving rescan offset information, and
   wherein rescanning the discovery signal resource region comprises rescanning the discovery signal resource region based on the rescan offset information.

4. The method of claim 1, wherein rescanning the discovery signal resource region comprises:
   transmitting a discovery signal on a resource other than the selected resource in the discovery signal resource region; and
   rescanning the discovery signal resource region except for the resource used for discovery signal transmission.

5. The method of claim 1, wherein rescanning the discovery signal resource region comprises:
   changing the existing rescan period if the scanning result indicates that the information about a different terminal having transmitted a discovery signal is changed by an amount greater than or equal to a preset threshold; and
   rescanning the discovery signal resource region according to the changed rescan period.

6. The method of claim 1, further comprising receiving information for a change in the discovery signal resource region, and wherein rescanning the discovery signal resource region comprises changing the existing rescan period if the resource used for discovery signal transmission does not belong to the changed discovery signal resource region, and rescanning the changed discovery signal resource region according to the changed rescan period.

7. The method of claim 1, wherein rescanning the discovery signal resource region comprises rescanning the discovery signal resource region according to a rescan period determined based on the mobility of the terminal.

8. A terminal transmitting and receiving signals in a mobile communication system, comprising:
   a transceiver configured to transmit and receive at least one signal; and
   a controller coupled with the transceiver and configured to:
   receive discovery signal configuration information including period information for rescanning a discovery signal
   scan a discovery signal resource region determined based on configuration information,
   transmit a discovery signal on a resource of the discovery signal resource region selected based on the scanning result, and
   rescan the discovery signal resource region based on at least one of the configuration information and the scanning result.

9. The terminal of claim 8, wherein the controller scans the discovery signal resource region except for the selected resource.

10. The terminal of claim 8, wherein the controller receives rescan offset information, and rescans the discovery signal resource region based on the rescan offset information.

11. The terminal of claim 8, wherein the controller transmits a discovery signal on a resource other than the selected resource in the discovery signal resource region, and rescans the discovery signal resource region except for the resource used for discovery signal transmission.

12. The terminal of claim 8, wherein the controller changes the existing rescan period if the scanning result indicates that the information about a different terminal having transmitted a discovery signal is changed by an amount greater than or equal to a preset threshold, and rescans the discovery signal resource region according to the changed rescan period.

13. The terminal of claim 8, wherein the controller receives information for a change in the discovery signal resource region, changes the existing rescan period if the resource used for discovery signal transmission does not belong to the changed discovery signal resource region, and rescans the changed discovery signal resource region according to the changed rescan period.

14. The terminal of claim 8, wherein the controller rescans the discovery signal resource region according to a rescan period determined based on the mobility of the terminal.

15. A method of transmitting and receiving signals for a base station in a mobile communication system, the method comprising:
   transmitting, to a terminal, discovery signal configuration information including period information for rescanning a discovery signal; and
   receiving, from the terminal, a discovery signal on a resource,
   wherein a discovery signal resource region is determined by the terminal based on the discovery signal configuration information and the resource is selected by the terminal from the discovery signal resource region according to the result of scanning the discovery signal resource region,
   wherein the terminal rescans the discovery signal resource region based on at least one of the discovery signal configuration information and the scanning result.

16. A base station transmitting and receiving signals in a mobile communication system, comprising:
   a transceiver configured to transmit and receive at least one signal; and
   a controller coupled with the transceiver and configured to:
   transmit, to a terminal, discovery signal configuration information including period information for rescanning a discovery signal, and
   receive a discovery signal transmitted by the terminal on a resource,
   wherein a discovery signal resource region is determined by the terminal based on the discovery signal configuration information and the resource is selected by the terminal from the discovery signal resource region according to the result of scanning the discovery signal resource region,
   wherein the terminal rescans the discovery signal resource region based on at least one of the discovery signal configuration information and the scanning result.

* * * * *